United States Patent
Shachar et al.

(10) Patent No.: US 12,182,277 B2
(45) Date of Patent: Dec. 31, 2024

(54) MONITORING FILE SHARING COMMANDS BETWEEN NETWORK EQUIPMENT TO IDENTIFY ADVERSE CONDITIONS

(71) Applicant: Dell Products L.P., Round Rock, TX (US)

(72) Inventors: Tomer Shachar, Omer (IL); Yevgeni Gehtman, Modi'in (IL); Maxim Balin, Gan-Yavne (IL)

(73) Assignee: DELL PRODUCTS L.P., Round Rock, TX (US)

( * ) Notice: Subject to any disclaimer, the term of this patent is extended or adjusted under 35 U.S.C. 154(b) by 221 days.

(21) Appl. No.: 17/581,282

(22) Filed: Jan. 21, 2022

(65) Prior Publication Data

US 2023/0237164 A1 Jul. 27, 2023

(51) Int. Cl.
*G06F 21/60* (2013.01)
*G06F 21/62* (2013.01)
*H04L 9/40* (2022.01)
*H04L 67/1097* (2022.01)

(52) U.S. Cl.
CPC ........ *G06F 21/602* (2013.01); *G06F 21/6227* (2013.01); *H04L 63/1416* (2013.01); *H04L 63/1425* (2013.01); *H04L 67/1097* (2013.01)

(58) Field of Classification Search
CPC .......... G06F 21/54; G06F 21/55; G06F 21/56; G06F 21/60; G06F 21/62; G06F 21/554; G06F 21/566; G06F 21/568; G06F 21/6227; H04L 63/145; H04L 63/1408; H04L 63/1416; H04L 63/1425; H04L 9/002;

(Continued)

(56) References Cited

U.S. PATENT DOCUMENTS

| 10,133,866 B1 * | 11/2018 | Kumar | G06F 21/565 |
| 11,606,689 B1 * | 3/2023 | Mhaske | H04W 12/068 |
| 2005/0223014 A1 * | 10/2005 | Sharma | H04L 67/1097 |

(Continued)

OTHER PUBLICATIONS

Schachar, et al. "Dividing Data Between Storage Equipment in Different Security Zones" U.S. Appl. No. 17/867,669, filed Jul. 18, 2022, 46 pages.

(Continued)

*Primary Examiner* — James N Fiorillo
(74) *Attorney, Agent, or Firm* — Amin, Turocy & Watson, LLP

(57) ABSTRACT

The technologies described herein are generally directed toward monitoring file sharing commands between network equipment to identify adverse conditions. According to an embodiment, a system can comprise a processor and a memory that can enable performance of operations including monitoring resource sharing communication between first network equipment and second network equipment via a network. In one or more embodiments, the method can additionally include based on the resource sharing communication, detecting a condition of the resource sharing communication that has a likelihood of indicating a defined adverse event that has at least a threshold likelihood. Further, the method can include, but are not limited to, in response to detecting the condition, facilitating suspending the resource sharing communication between the first network equipment and the second network equipment.

20 Claims, 10 Drawing Sheets

(58) Field of Classification Search
CPC ....... H04L 9/40; H04L 67/1097; H04L 43/00; H04L 63/20; H04L 63/425
USPC .......................................................... 713/168
See application file for complete search history.

(56) References Cited

U.S. PATENT DOCUMENTS

| | | | | |
|---|---|---|---|---|
| 2009/0094373 | A1* | 4/2009 | Lepeska | G06F 15/16 709/230 |
| 2015/0310219 | A1* | 10/2015 | Haager | H04L 9/0869 713/165 |
| 2017/0054738 | A1* | 2/2017 | Avidan | H04L 63/1416 |
| 2018/0018344 | A1* | 1/2018 | Kilaru | G06F 3/0643 |
| 2018/0077171 | A1* | 3/2018 | Ramanujan | H04L 63/1483 |
| 2019/0332788 | A1* | 10/2019 | Beskrovny | G06F 21/577 |
| 2020/0028862 | A1* | 1/2020 | Lin | H04L 63/104 |
| 2020/0304528 | A1* | 9/2020 | Ackerman | G06F 17/18 |
| 2020/0364354 | A1* | 11/2020 | Schwartz | G06F 21/604 |
| 2021/0133331 | A1* | 5/2021 | Lipkis | H04L 63/1483 |
| 2021/0216628 | A1* | 7/2021 | Kutner | G06F 11/1458 |
| 2021/0271757 | A1* | 9/2021 | Horspool | G06F 21/554 |
| 2021/0357504 | A1* | 11/2021 | Saad | G06F 21/567 |
| 2021/0397711 | A1* | 12/2021 | Karr | G06F 11/2094 |
| 2022/0038468 | A1* | 2/2022 | Jeevagunta | H04L 63/1425 |
| 2022/0164387 | A1* | 5/2022 | Patel | G06F 16/13 |
| 2022/0191217 | A1* | 6/2022 | Rose | H04L 63/1425 |
| 2022/0303300 | A1* | 9/2022 | Egan | H04L 63/1416 |
| 2023/0153438 | A1* | 5/2023 | Bhagi | G06F 21/78 726/26 |
| 2023/0229761 | A1* | 7/2023 | Laplante | G06F 21/54 726/22 |
| 2023/0239296 | A1* | 7/2023 | Shachar | H04L 63/101 726/4 |
| 2023/0281088 | A1* | 9/2023 | Mathew | G06F 11/1464 707/649 |
| 2023/0291754 | A1* | 9/2023 | Fricano | H04L 63/20 |
| 2023/0334153 | A1 | 10/2023 | Shachar et al. | |
| 2023/0334185 | A1* | 10/2023 | Balin | H04L 67/1097 |

OTHER PUBLICATIONS

Non Final Office Action received for U.S. Appl. No. 17/721,177 dated Feb. 1, 2024, 33 pages.

Final Office Action received for U.S. Appl. No. 17/721,177 dated Jun. 13, 2024, 32 pages.

* cited by examiner

MONITORING FILE SHARING COMMANDS BETWEEN NETWORK EQUIPMENT TO IDENTIFY ADVERSE CONDITIONS

BACKGROUND

Modern data storage computer systems can facilitate the storage and manipulation of data by a variety of different network equipment. Problems can occur when malware is secretly controlling the operation of otherwise authorized data manipulation equipment. In some circumstances, combinations of different file sharing commands can be used to cause adverse events on storage equipment. For example, file locking procedures designed to prevent conflicts between different systems can be used by malware, along with removal commands, to enable temporary or permanent malicious restricting of access to large amounts of the stored data of an organization.

These problems can be further enhanced when data is stored and accessed within a cloud-based environment, e.g., because the physical hardware of the data storage system cannot be easily accessed and disabled.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to monitor, by security equipment comprising a processor, resource sharing communication between first network equipment and second network equipment via a network. The instructions can include an instruction to, based on the resource sharing communication, detect, by the security equipment, a condition of the resource sharing communication that has a likelihood of indicating a defined adverse event that has at least a threshold likelihood. Further, the instructions can include an instruction to, in response to detecting the condition, facilitate, by the security equipment, suspending the resource sharing communication between the first network equipment and the second network equipment.

An example method can comprise monitoring, by security equipment comprising a processor, resource sharing communication between first network equipment and second network equipment via a network. The method can further include, based on the resource sharing communication, detecting, by the security equipment, a condition of the resource sharing communication that has a likelihood of indicating a defined adverse event that has at least a threshold likelihood. Further, the method can include, in response to detecting the condition, facilitating, by the security equipment, suspending the resource sharing communication between the first network equipment and the second network equipment.

An example non-transitory computer-readable medium can comprise instructions that, in response to execution, cause a system comprising a processor to perform operations. These operations can comprise monitoring, by security equipment comprising a processor, resource sharing communication between first network equipment and second network equipment via a network. The operations can further include, based on the resource sharing communication, detecting, by the security equipment, a condition of the resource sharing communication that has a likelihood of indicating a defined adverse event that has at least a threshold likelihood. Further, the method can, in response to detecting the condition, facilitating, by the security equipment, suspending the resource sharing communication between the first network equipment and the second network equipment.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate monitoring file sharing commands between network equipment to identify adverse conditions. One or more embodiments can use different approaches to, without adversely affecting system performance, detect adverse conditions that can occur when networked equipment uses resource sharing communications (e.g., commands) to alter data on data storage equipment. Monitoring and analyzing commands generated for data manipulation can, in one or more embodiments, result in the detection of malware before damage to a data store occurs.

One having skill in the relevant art(s), given the description herein, appreciate that different types of malware and other adverse conditions can be handled in some circumstances, including, but not limited to, ransomware, file tampering, denial of service attacks, and data leakage. For example, in one or more embodiments, the resource sharing can be combination of commands issued by the first network equipment that improperly restricts access to resources stored by the second network equipment, e.g., a denial of service attack. In additional or alternative embodiments, the unauthorized restriction of access to the resources stored by the second network equipment can be a ransomware attack targeting the resources stored via the second network equipment, e.g., a cryptographic malware attack by the first network equipment on the second network equipment. Additional illustrative examples are provided below.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
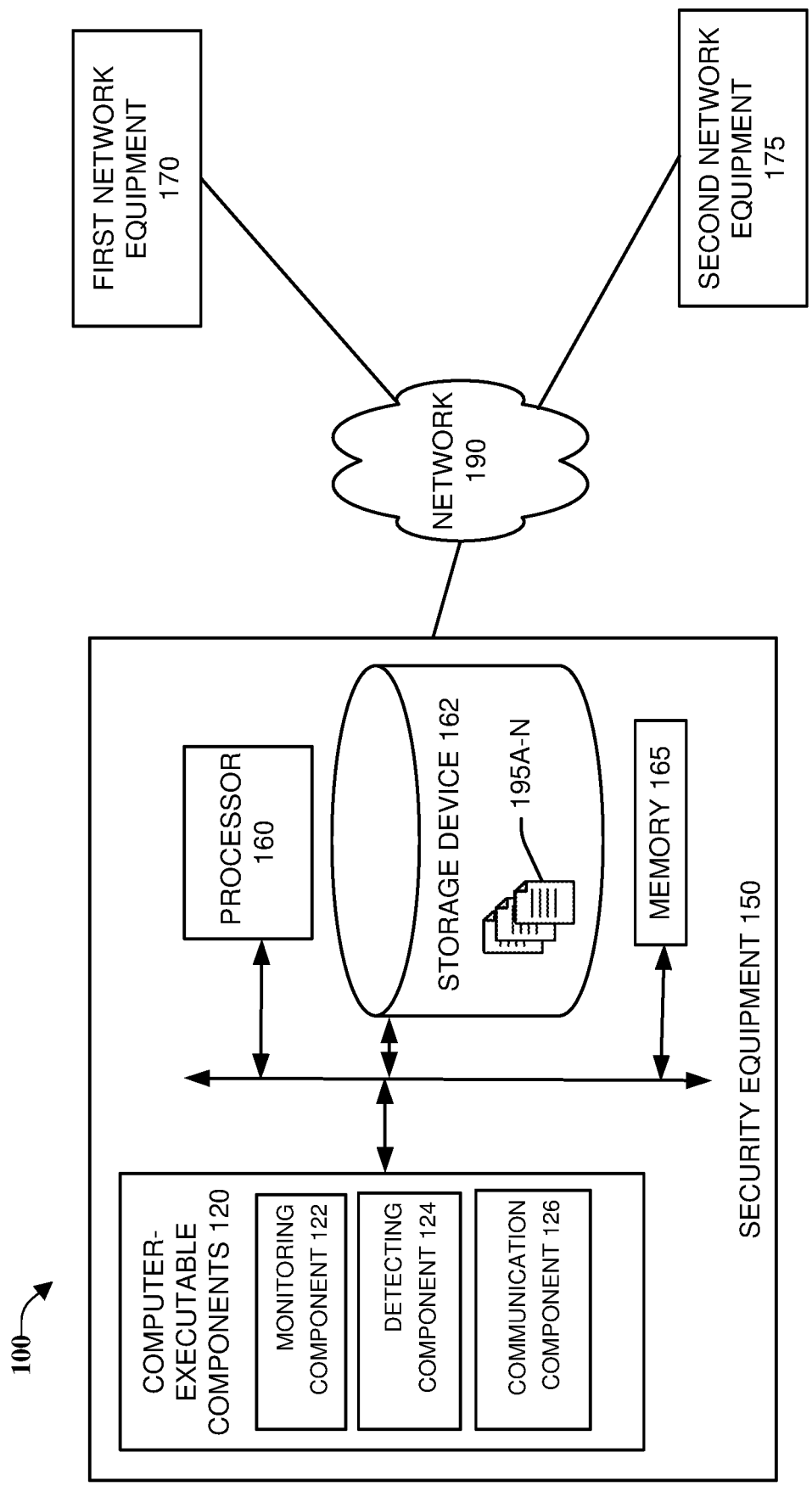
FIG. 1 is an architecture diagram of an example system that can facilitate monitoring file sharing commands between network equipment to identify adverse conditions, in accordance with one or more embodiments.

FIG. 1 is an architecture diagram of an example system 100 that can facilitate monitoring file sharing commands between network equipment to identify adverse conditions, in accordance with one or more embodiments. For purposes of brevity, description of like elements and/or processes employed in other embodiments is omitted. As depicted, system 100 includes security equipment 150 connected to first network equipment 170 and second network equipment 175 via network 190. According to multiple embodiments, security equipment 150 can include memory 165 that can store one or more computer and/or machine readable, writable, and/or executable components 120 and/or instructions.

In embodiments, security equipment 150 can further include processor 160 and storage device 162. In one or more embodiments, computer-executable components 120, when executed by processor 160, can facilitate performance of operations defined by the executable component(s) and/or instruction(s). Computer executable components 120 can include monitoring component 122, detecting component 124, communication component 126, and other components described or suggested by different embodiments described herein, that can improve the operation of system 100. As discussed further below, storage device 162 can include device activity profiles 195A-N.

It should be noted that, to illustrate some examples of embodiments herein, communication between data manipulating equipment (e.g., first network equipment 170) and data storage equipment (second network equipment 175) are described as utilizing a server message block (SMB) communications profile. As is appreciated by one having skill in the relevant art(s), given the description herein, one or more embodiments can other communications protocols can provide similar means for facilitating the issuance of commands between similarly arranged network equipment.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

It is understood that the computer processing systems, computer-implemented methods, apparatus, and computer program products described herein employ computer hardware and/or software to solve problems that are highly technical in nature (e.g., rapidly evaluating network command activity and controlling communication among devices in different contexts), that are not abstract and cannot be performed as a set of mental acts by a human. For example, a human, or even a plurality of humans, cannot efficiently generate or apply complex models of the activity of network equipment with a level of accuracy and/or efficiency as the various embodiments described herein.

In one or more embodiments, memory 165 can store computer and/or machine readable, writable, and/or executable components 120 and/or instructions that, when executed by processor 160, can facilitate execution of the various functions described herein relating to monitoring component 122, detecting component 124, communication component 126, as well as other components to implement and provide functions to system 100, and some other embodiments described herein.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of monitoring component 122, which can in some implementations, can monitor resource sharing communication between network equipment via a network. As discussed with FIGS. 3-5 below, one or more embodiments can monitor (e.g., by security equipment 150), resource sharing communication between first network equipment 170 and second network equipment 175 via a network.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of detecting component 124, which can in some implementations, can, based on the resource sharing communication, detect, by the security equipment, a condition of the resource sharing communication that has a likelihood of indicating a defined adverse event that has at least a threshold likelihood. As discussed with FIGS. 3-5 below, one or more embodiments can, based on the resource sharing communication, detect, by security equipment 150, a condition of the resource sharing communication (e.g., activity that deviates from a profile associated with first network equipment 170) that has a likelihood of indicating a defined adverse event (e.g., malware from first network equipment 170) that has at least a threshold likelihood.

As discussed further with FIGS. 3-4 below, one approach to detecting anomalous activity in commands from first network equipment 170 to second network equipment 175 is to generate activity profiles 195A-N for command issuing network equipment, e.g., activity profile 195A can be generated based on monitoring the activity of first network equipment 175.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of communication component 126, which can in some implementations, can, in response to detecting the condition, facilitate suspending the resource sharing communication between the first network equipment and the second network equipment. As discussed with FIGS. 3-5 below, one or more embodiments can, in response to detecting the condition (e.g., potential malware activity), facilitate suspending the resource sharing communication between the first network equipment 170 and the second network equipment 175.

It is appreciated that the embodiments of the subject disclosure depicted in various figures disclosed herein are for illustration only, and as such, the architecture of such embodiments are not limited to the systems, devices, and/or components depicted therein. For example, in some embodiments, security equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

It should be noted that security equipment 150 can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as security equipment 150.

Figure 2:
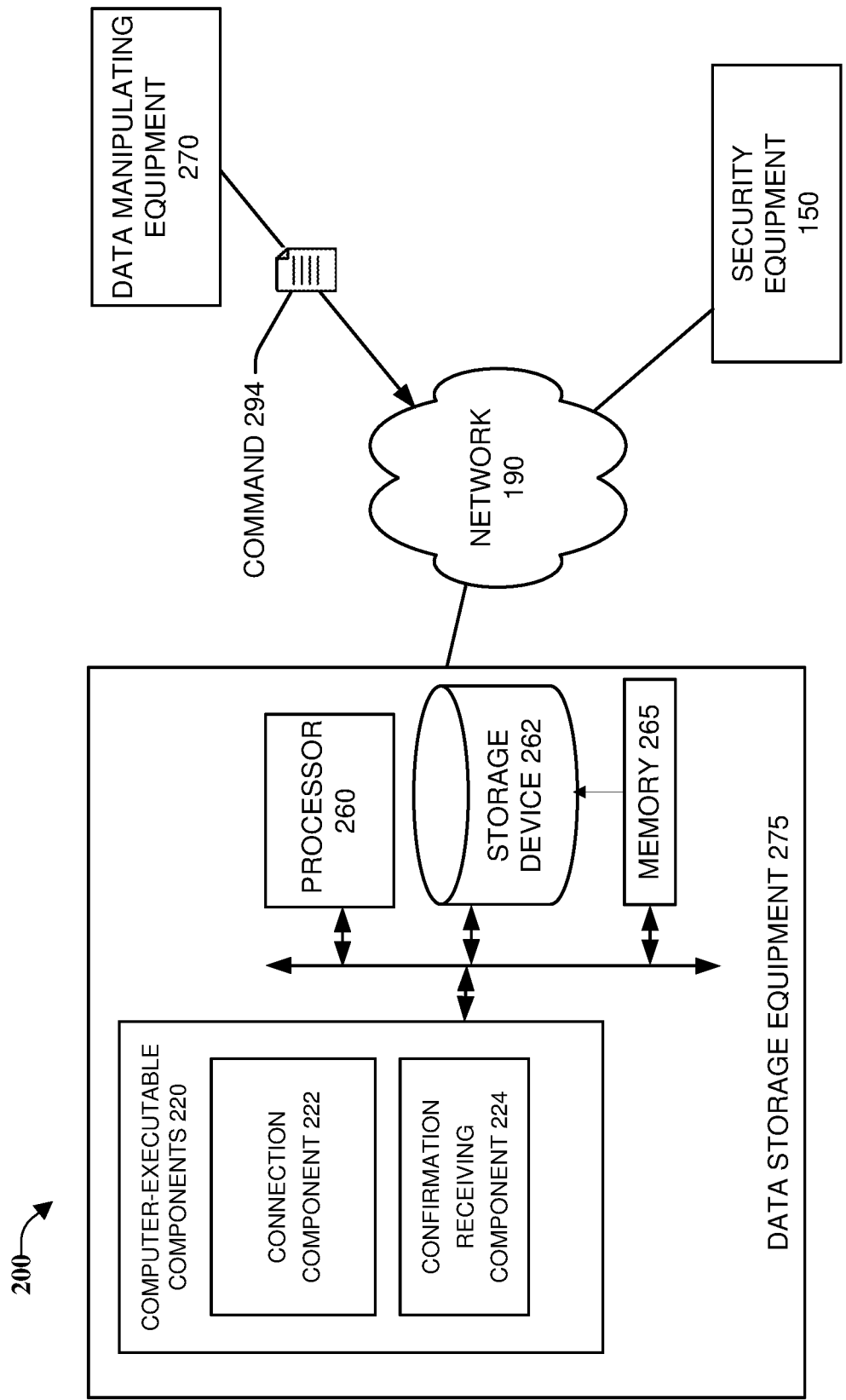
FIG. 2 is an architecture diagram of an example system that can facilitate analyzing file sharing commands issued to data storage equipment by data manipulating equipment to identify adverse conditions, in accordance with one or more embodiments.

FIG. 2 is an architecture diagram of an example system 200 that can facilitate monitoring file sharing commands between network equipment to identify adverse conditions, in accordance with one or more embodiments. For purposes of brevity, description of like elements and/or processes employed in other embodiments is omitted. As depicted, system 200 includes data storage equipment 275 connected to data manipulating equipment, and security equipment 150 via network 190. Data manipulating equipment 270 is depicted as issuing command 294 to data storage equipment 275 via network 190. Example types of data storage equipment 275 can include, but are not limited to, financial services equipment, healthcare and pharmaceutical equipment, intelligent connected vehicle (ICV) equipment, and telecommunications systems equipment.

In embodiments, data storage equipment 275 can include processor 260 (e.g., similar to processor 160) and storage device 262, e.g., similar to storage device 162. According to multiple embodiments, data storage equipment 275 can further include memory 265 (similar to memory 165) that can store one or more computer and/or machine readable, writable, and/or executable components 220 and/or instructions that, when executed by processor 260, can facilitate performance of operations defined by the executable component(s) and/or instruction(s). According to multiple embodiments, memory 265 can store one or more computer and/or machine readable, writable, and/or executable components 220 and/or instructions, which can, when executed by processor 260, facilitate performance of operations defined by the executable component including connection component 222, indication component 224, and other components described or suggested by different embodiments described herein, that can improve the operation of system 200.

In one or more embodiments, computer executable components 220 can be used in connection with implementing one or more of the systems, devices, components, and/or computer-implemented operations shown and described in connection with FIG. 2 or other figures disclosed herein. In an example implementation of data storage equipment 275, memory 265 can store executable instructions that can facilitate generation of connection component 222, which in some implementations, can establish server communications with client equipment via a network. As discussed with FIGS. 3-5 below, one or more embodiments can establish server communications with client equipment via a network, e.g., data manipulating equipment 270.

Continuing this example implementation example, memory 265 can store executable instructions that can facilitate generation of indication receiving component 224, which in some implementations, can receive an indication that the server communications with the client equipment has been suspended by network equipment. For example, as discussed in further detail with FIG. 5 below, in one or more embodiments, security equipment 150 can suspend communications between data manipulating equipment 270 and data storage equipment 275. In some implementations, security equipment 150 suspends the server communications based on a determination of a likelihood of at least a threshold likelihood (e.g., above an estimated probability), that the server communications were communicated by the client equipment to maliciously restrict access to computer files, e.g., by malware discussed above.

Figure 3:
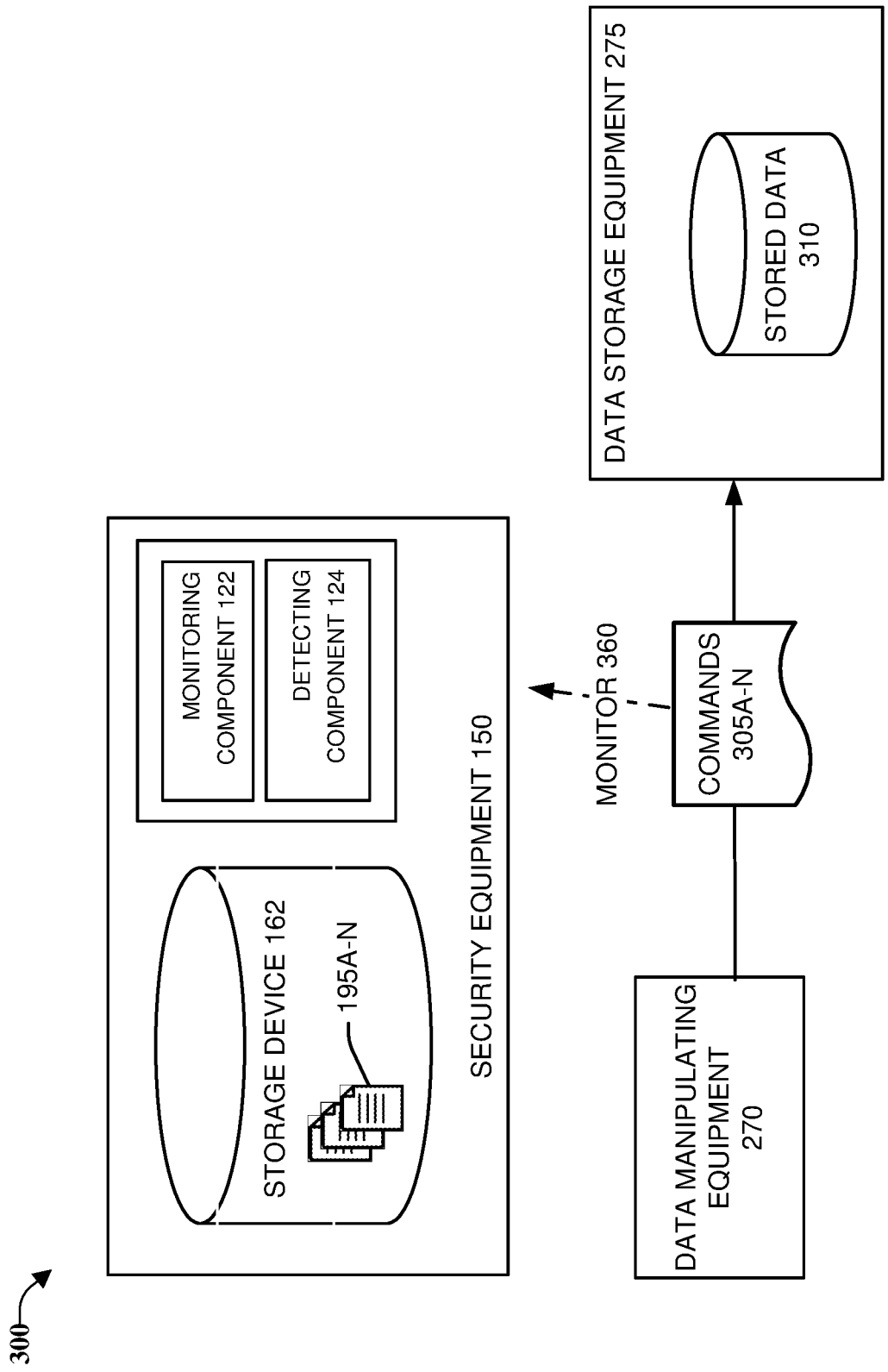
FIG. 3 is an architecture diagram of an example system that can facilitate monitoring file sharing commands between network equipment to identify adverse conditions, in accordance with one or more embodiments.

FIG. 3 is an architecture diagram of an example system 300 that can facilitate monitoring file sharing commands between network equipment to identify adverse conditions, in accordance with one or more embodiments. For purposes of brevity, description of like elements and/or processes employed in other embodiments is omitted. As depicted, system 300 includes security equipment 150 monitoring 360 the commands 305A-N issued by data manipulating equipment 270 to manipulate stored data 310 stored with data storage equipment 275. To illustrate different aspects of system 300, monitoring component 122 and detecting component 124, described with FIG. 1 above, are discussed in additional detail with FIG. 3. In addition, storage device 162 is included, along with stored activity profiles 195A-N.

As noted above, one or more embodiments can monitor and analyze communications between data manipulating equipment 270 and data storage equipment 275 to detect particular patterns of commands that can indicate a likelihood of the operation of malware by data manipulating equipment 270. One approach to this monitoring, used by one or more embodiments, involves monitoring client devices (e.g., data manipulating equipment 270) over time to determine a baseline of the resource sharing communication. One having skill in the relevant art(s), given the description herein, appreciates that this baseline can include different characteristics, including, but not limited to, characteristics of the executed data manipulation commands, e.g., the scope of executed commands, that is, the number of files typically manipulated by data manipulating equipment 270, and the type of manipulations performed.

In one or more embodiments, in real-time (e.g., as commands are being issued by data manipulating equipment 270) a flexible detection technique can be used to detect deviations from the baseline of that device, e.g., the 'normal behavior' of data manipulating equipment 270. For example, detection a number of access requests and READ/WRITE commands above a threshold, can be identified as an abnormal activity, e.g., a condition of the resource sharing communication from data manipulating equipment 270 that has a likelihood of indicating a defined adverse event (e.g., malware operation) that has at least a threshold likelihood of being in progress, e.g., to a confidence level or having a sufficient probability to warrant additional action. In another example, abnormal communication behavior can include a high volume of connection requests followed by different commands including, but. not limited to, locking files, using files to create other files (e.g., ransomware), and removing files.

Figure 4:
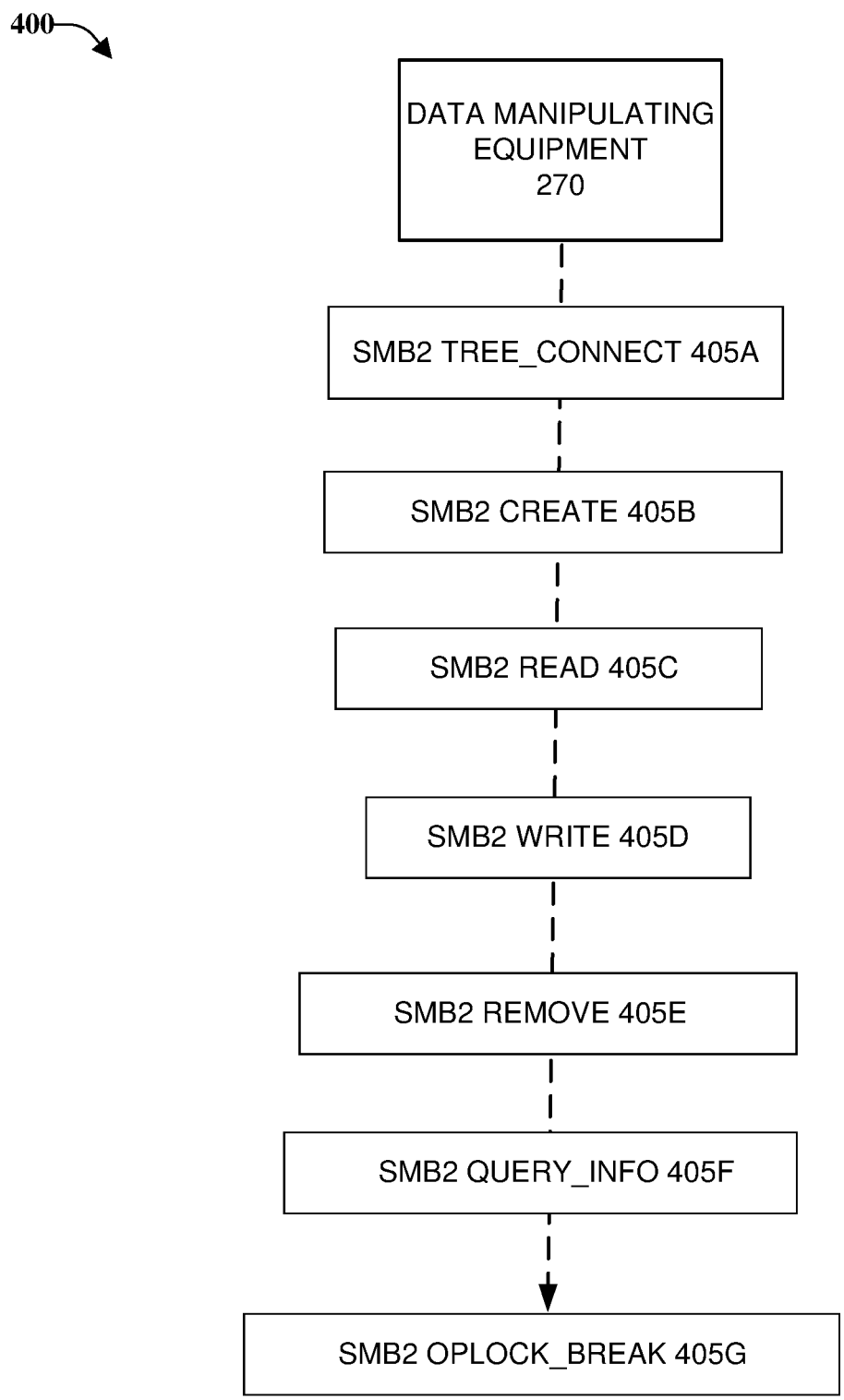
FIG. 4 depicts a diagram of an example pattern of commands that can indicate adverse conditions, in accordance with one or more embodiments.

FIG. 4 depicts a diagram of an example pattern of commands that can indicate adverse conditions, in accordance with one or more embodiments. For purposes of brevity, description of like elements and/or processes employed in other embodiments is omitted. As depicted, system 400 includes data manipulating component 270 issuing an example, non-limiting sequence of commands 405A-G, e.g., tree connect 405A, create 405B, read 405C, write 405D, remove 405E, query_info 405F, and oplock_break 405G.

It should be noted that, as depicted in FIG. 3, and to illustrate other examples of embodiments herein, communication between data manipulating equipment 270 and data storage equipment 275 (not shown) are described as utilizing commands from server message block 2.0 (SMB2) communications protocol. As is appreciated by one having skill in the relevant art(s), given the description herein, one or more embodiments can other communications protocols can provide similar means for facilitating the issuance of commands between similarly arranged network equipment. Thus, the command sequence 405A-G listed above has a prefix SMB2 before each command One of the ways to provide file storage service in Cloud environment is by SMB usage, which can facilitate cloud-based file shortage by data manipulating equipment 270.

The following discussion provides an example combination of commands that can indicated a likelihood of an access restricting malware operation. e.g., ransomware. In this example, a tree connect 405A command is sent to data storage equipment 275 by data manipulating component 270 to request access to a particular share in stored data 310. After access is granted create 405B can be used to request either creation of or access to a file, and read 405C command requests a read operation on the file. Based on the open shared file, command write 405D can write the file to an encrypted file, and command 405E can remove the file that was encrypted from the share. With query_info 405F information on a file can be provided by data storage equipment 275, and the oplock_break 405G command can be used by a malware program to lock a file while the encryption process is performed.

As noted above, one approach to applying different thresholds to different equipment at different times and for different activities, includes the generation of activity profiles 195A-N for different command-issuing equipment in different circumstances. In an example activity profile 195A applied to data manipulating component 270, a system profile can include a threshold for the operation of create 405B command, e.g., to identify when an unusually large number of files are accessed. Similarly, activity profile 195A can include a threshold for the operation of remove 405E, e.g., to identify when an unusually large number of files are removed. One having skill in the relevant art(s), given the description herein, appreciate that different commands noted and suggested by descriptions above can have different type of thresholds, e.g., to detect a variety of malware operations.

Additional illustrative examples of different malware types that can be handled by one or more embodiments are provided below. Another example malware activity includes the tampering with particular stored files. One indication of this type of attach that can be detected by one or more embodiments is the issuance of a high number (e.g., based on the activity profile) of write 405D commands Another malware attack that can be addressed by one or more embodiments includes a denial of service attack to deny access to stored data 310. Example activities that can indicate this condition include commands to lock access to an unusual number of files on a particular share for the issuing network equipment multiple files, e.g., an SMB LOCK command.

Another type of attack that can be prevented by one or more embodiments includes a data leakage attack on stored data 310, e.g., often a large number of files are secretly accessed and copied outside of storage device 162. Patterns of commands that can facilitate the detection of this activity by one or more embodiments include patterns of copying data outside the storage system, e.g., combinations of one or more patterns based on time, number of files, and analysis of the manipulation of a 'flood' (relatively excessive amount) of files. For example, an SMB2 READ command can be used to read a high volume of files/directories read, e.g., to facilitate the data leakage attack.

Figure 5:
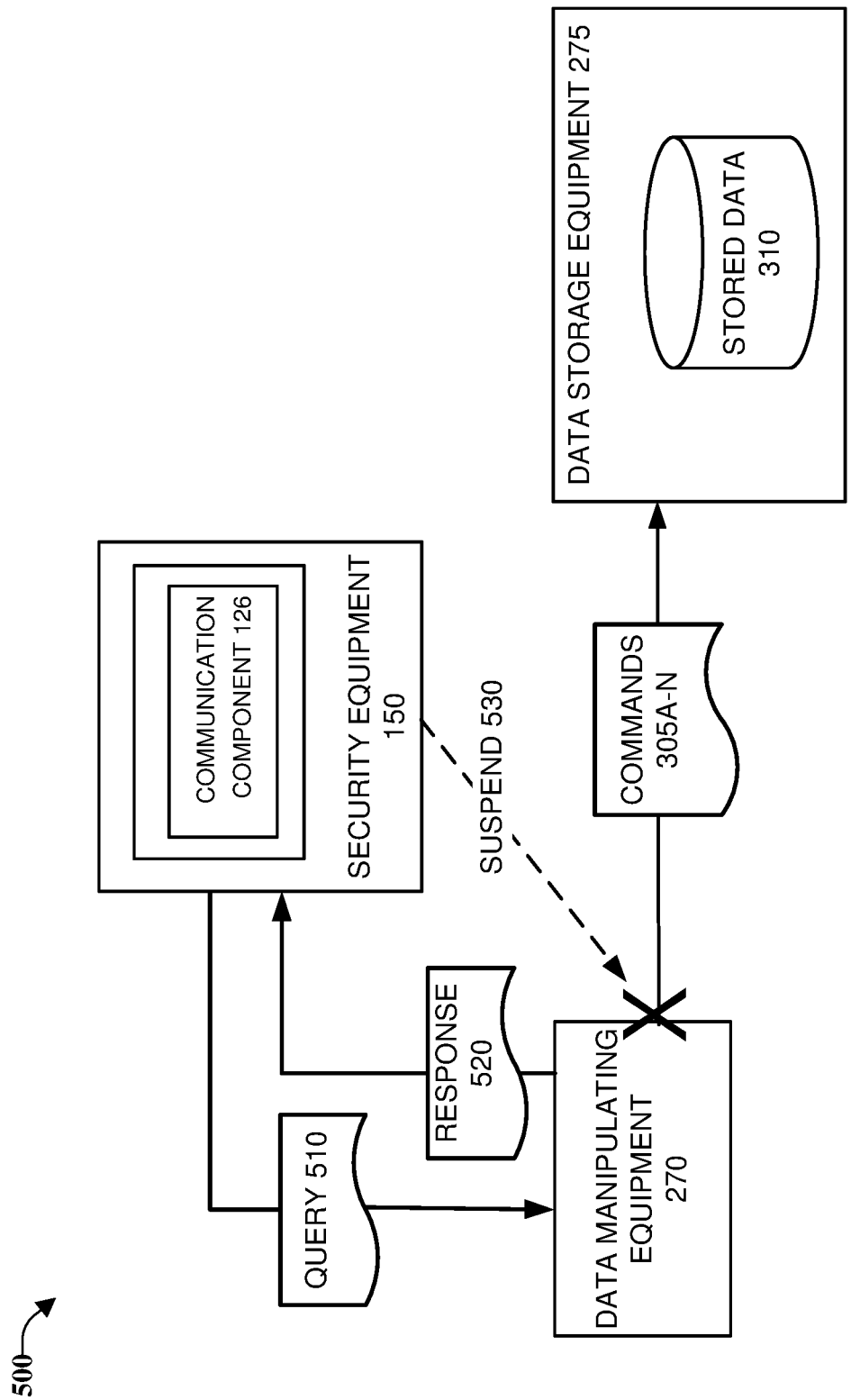
FIG. 5 depicts an architectural diagram that can facilitate monitoring file sharing commands between network equipment to identify adverse conditions, in accordance with one or more embodiments.

FIG. 5 depicts an architectural diagram 500 that can facilitate monitoring file sharing commands between network equipment to identify adverse conditions, in accordance with one or more embodiments. For purposes of brevity, description of like elements and/or processes employed in other embodiments is omitted. As depicted, system 500 includes security equipment 150 monitoring 360 the commands 305A-N issued by data manipulating equipment 270 to manipulate stored data 310 stored with data storage equipment 275. In additional details from FIG. 3, security equipment sends query 510 to, and received response 520 from, data manipulating equipment 270. In addition, security equipment 150 is depicted a suspending 530 the issuance of commands from data manipulating equipment 270.

In one or more embodiments, different actions can be performed in response to a determination that a threshold likelihood exists of an adverse condition resulting from monitored sharing commands. As depicted on FIG. 5, in one or more embodiments communication component 126 of security equipment 150 can suspend 530 commands 305A-N from data manipulating equipment 270. One having skill in the relevant art(s), given the description herein, appreciates that other approaches can be used to respond to potential adverse events detected, e.g., including but not limited to, blocking commands being processed by data storage equipment 275, and redirecting commands to an alternative destination for analysis.

Once an initial response to the adverse event has been performed, one or more embodiments can use query 510 to gather information from data manipulating equipment 270, e.g., to provide notice of the potential attack, and/or to check for a potential false-positive result. In one or more embodiments, response 520 can be provided by an entity in control of manipulating equipment 270 (e.g., a human or artificial intelligence user) can provide additional approval information, or a software process issuing the commands at issue can provide an example data underlying the commands.

When considering query 510 as an approach used to mitigate potential false positive results, it should be noted that a baseline of activities and workflow of manipulating equipment 270 was used to detect the potential activity. Based on this baseline of activities, one or more embodiments can query workflow processes to determine information that can be a cause of the potential malware activity, e.g., relatively large amounts of file locking, removing, and creation of other files based on shared resources. In one or more embodiments, this analysis, by the security equipment, of activity and responses 520 of manipulating equipment 270 can reduce the likelihood of defined adverse event below the threshold likelihood.

Figure 6:
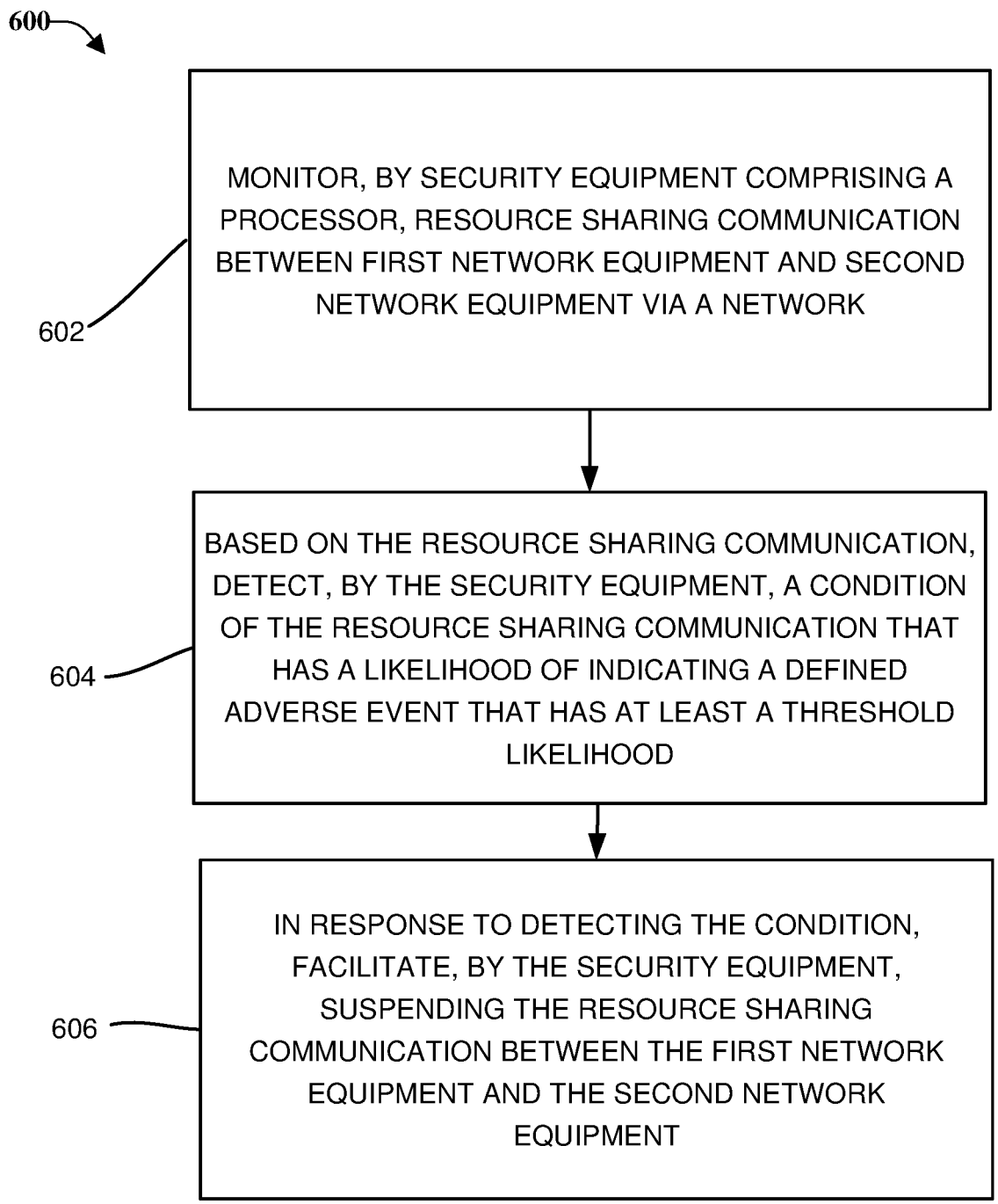
FIG. 6 depicts a flow diagram representing example operations of an example method that can facilitate monitoring file sharing commands between network equipment to identify adverse conditions, in accordance with one or more embodiments.

FIG. 6 depicts a flow diagram representing example operations of an example method 600 that can facilitate monitoring file sharing commands between network equipment to identify adverse conditions, in accordance with one or more embodiments. For purposes of brevity, description of like elements and/or processes employed in other embodiments is omitted.

In some examples, one or more embodiments of method 600 can be implemented by monitoring component 122, detecting component 124, communication component 126, and other components that can be used to implement aspects of method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

At 602 of method 600, monitoring component 122 can, in one or more embodiments, monitor, by security equipment comprising a processor, resource sharing communication between first network equipment and second network equipment via a network. At 604 of method 600, detecting component 124 can, in one or more embodiments, based on the resource sharing communication, detect, by the security equipment, a condition of the resource sharing communication that has a likelihood of indicating a defined adverse event that has at least a threshold likelihood. At 606 of method 600, communication component 126 can, in one or more embodiments, in response to detecting the condition, facilitate, by the security equipment, suspending the resource sharing communication between the first network equipment and the second network equipment.

Figure 7:
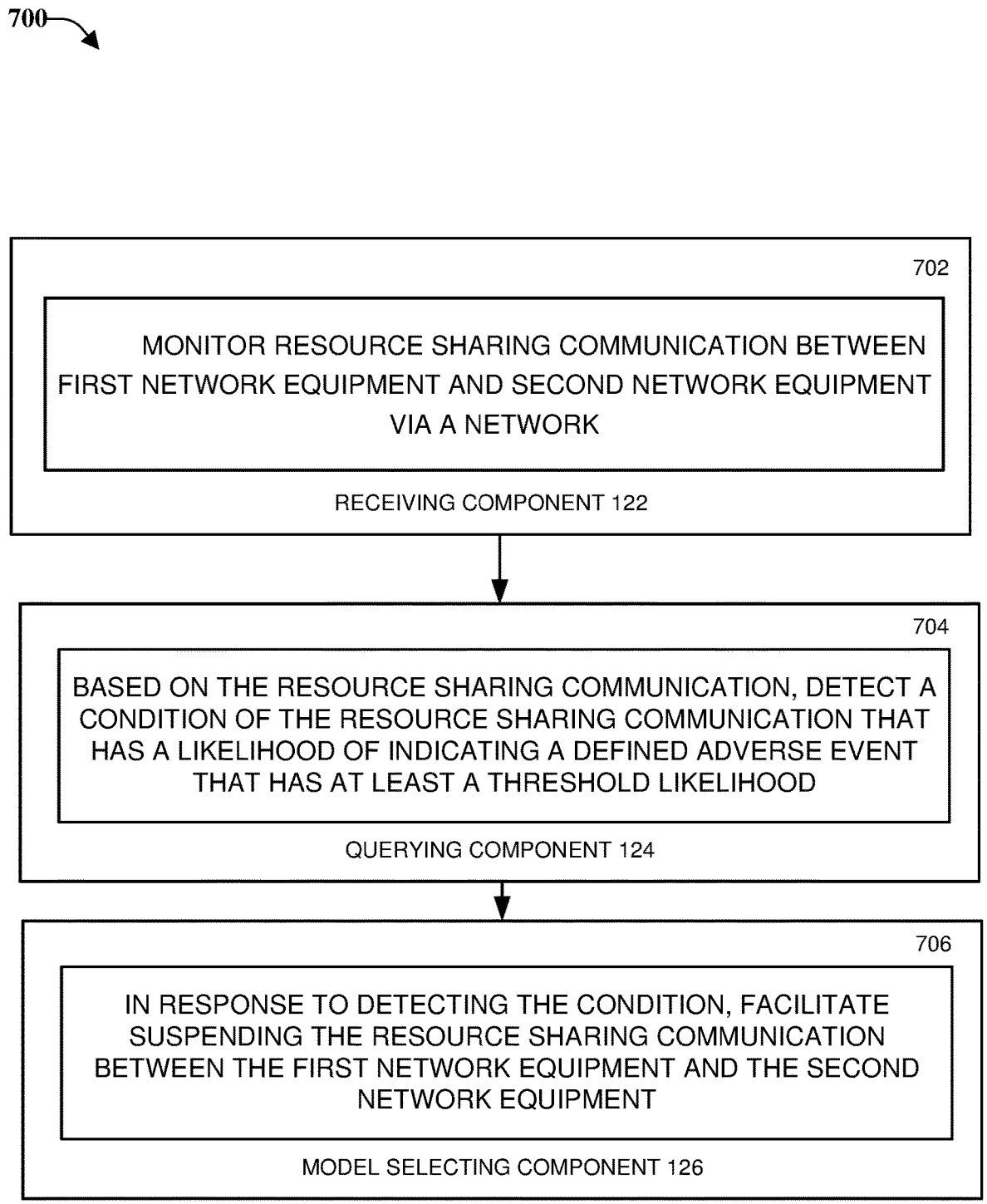
FIG. 7 depicts an example system that can facilitate monitoring file sharing commands between network equipment to identify adverse conditions, in accordance with one or more embodiments.

FIG. 7 depicts an example system 700 that can facilitate monitoring file sharing commands between network equipment to identify adverse conditions, in accordance with one or more embodiments. For purposes of brevity, description of like elements and/or processes employed in other embodiments is omitted. Example system 700 can include monitoring component 122, detecting component 124, communication component 126, and other components that can be used to implement aspects of system 700, as described herein, in accordance with one or more embodiments.

At 702 of FIG. 7, monitoring component 122 can monitor, by security equipment comprising a processor, resource sharing communication between first network equipment and second network equipment via a network. At 704 of FIG. 7, detecting component 124 can, based on the resource sharing communication, detect, by the security equipment, a condition of the resource sharing communication that has a likelihood of indicating a defined adverse event that has at least a threshold likelihood. At 706 of FIG. 7, communication component 126 can, in response to detecting the condition, facilitate, by the security equipment, suspending the resource sharing communication between the first network equipment and the second network equipment.

Figure 8:
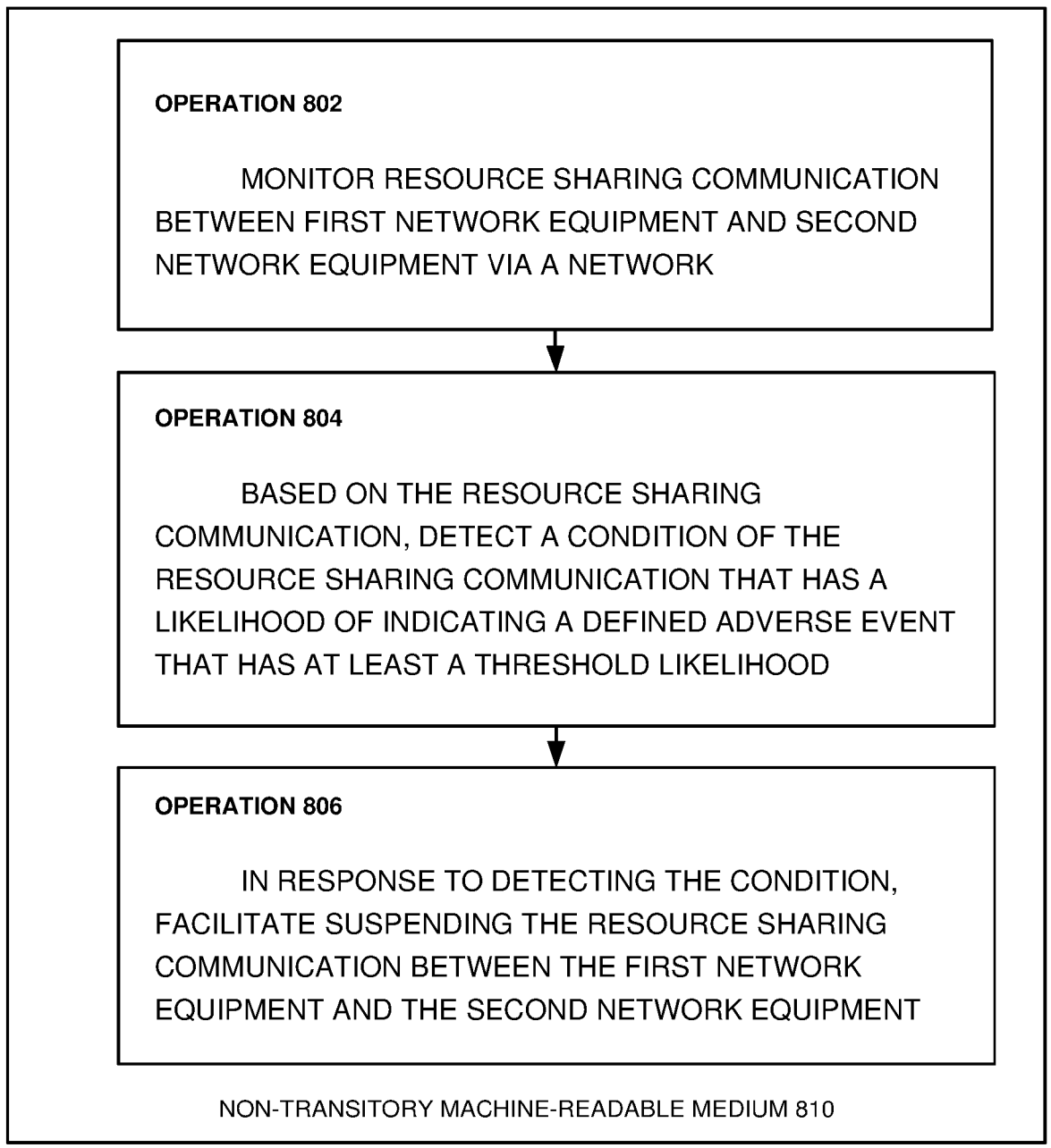
FIG. 8 depicts an example non-transitory machine-readable medium that can include executable instructions that, when executed by a processor of a system, facilitate monitoring file sharing commands between network equipment to identify adverse conditions, in accordance with one or more embodiments.

FIG. 8 depicts an example non-transitory machine-readable medium 800 that can include executable instructions that, when executed by a processor of a system, facilitate monitoring file sharing commands between network equipment to identify adverse conditions, in accordance with one or more embodiments. For purposes of brevity, description of like elements and/or processes employed in other embodiments is omitted.

Operation 802 of FIG. 8 can facilitate generation of monitoring component 122, which, in one or more embodiments, can monitor resource sharing communication between first network equipment and second network equipment via a network. Operation 804 of FIG. 8 can facilitate generation of detecting component 124 which, in one or more embodiments, can, based on the resource sharing communication, detect a condition of the resource sharing communication that has a likelihood of indicating a defined adverse event that has at least a threshold likelihood. Operation 806 of FIG. 8 can facilitate generation of communication component 126 which, in one or more embodiments, can, in response to detecting the condition, facilitate suspending the resource sharing communication between the first network equipment and the second network equipment.

Figure 9:
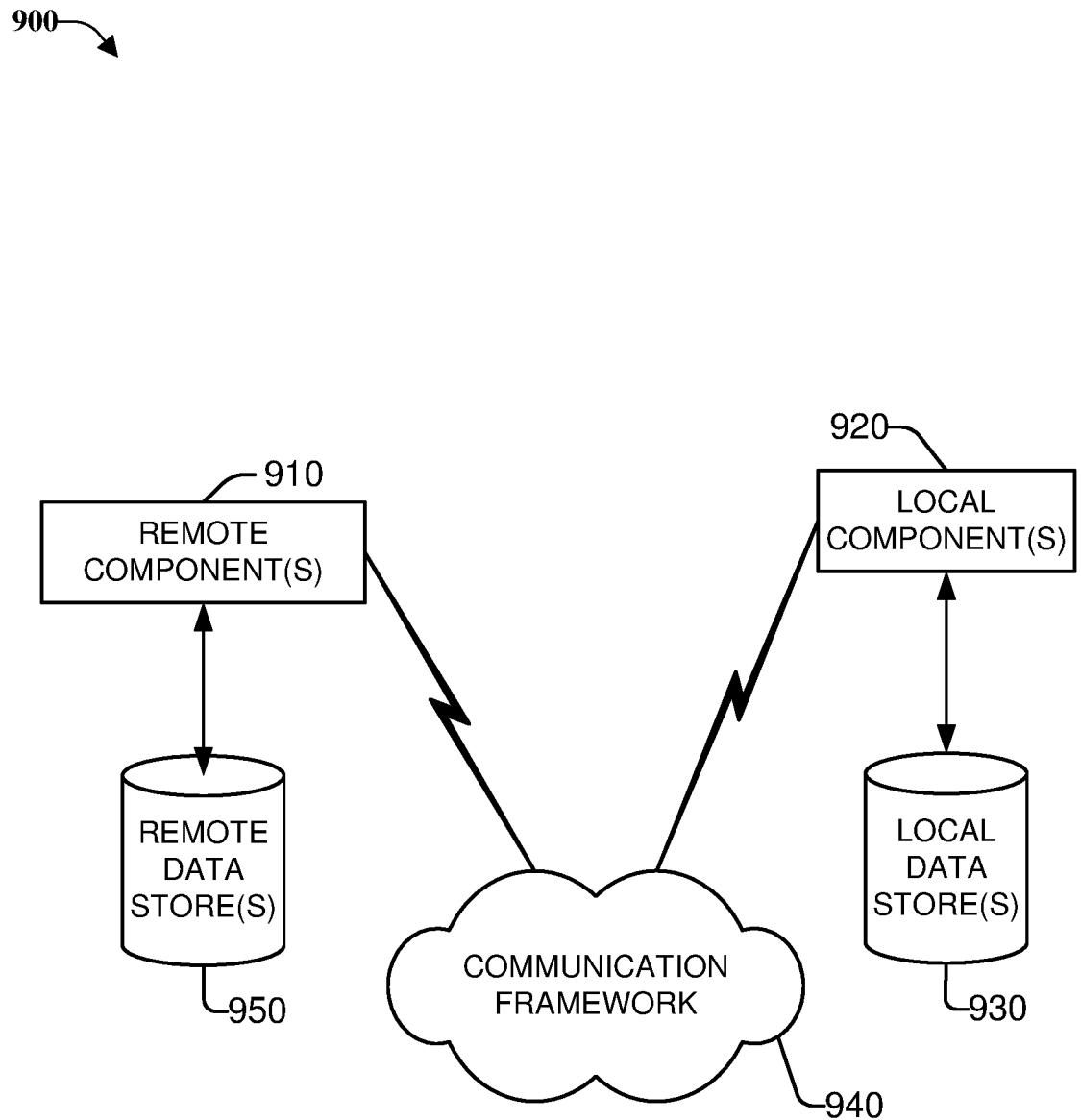
FIG. 9 depicts an example schematic block diagram of a computing environment with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
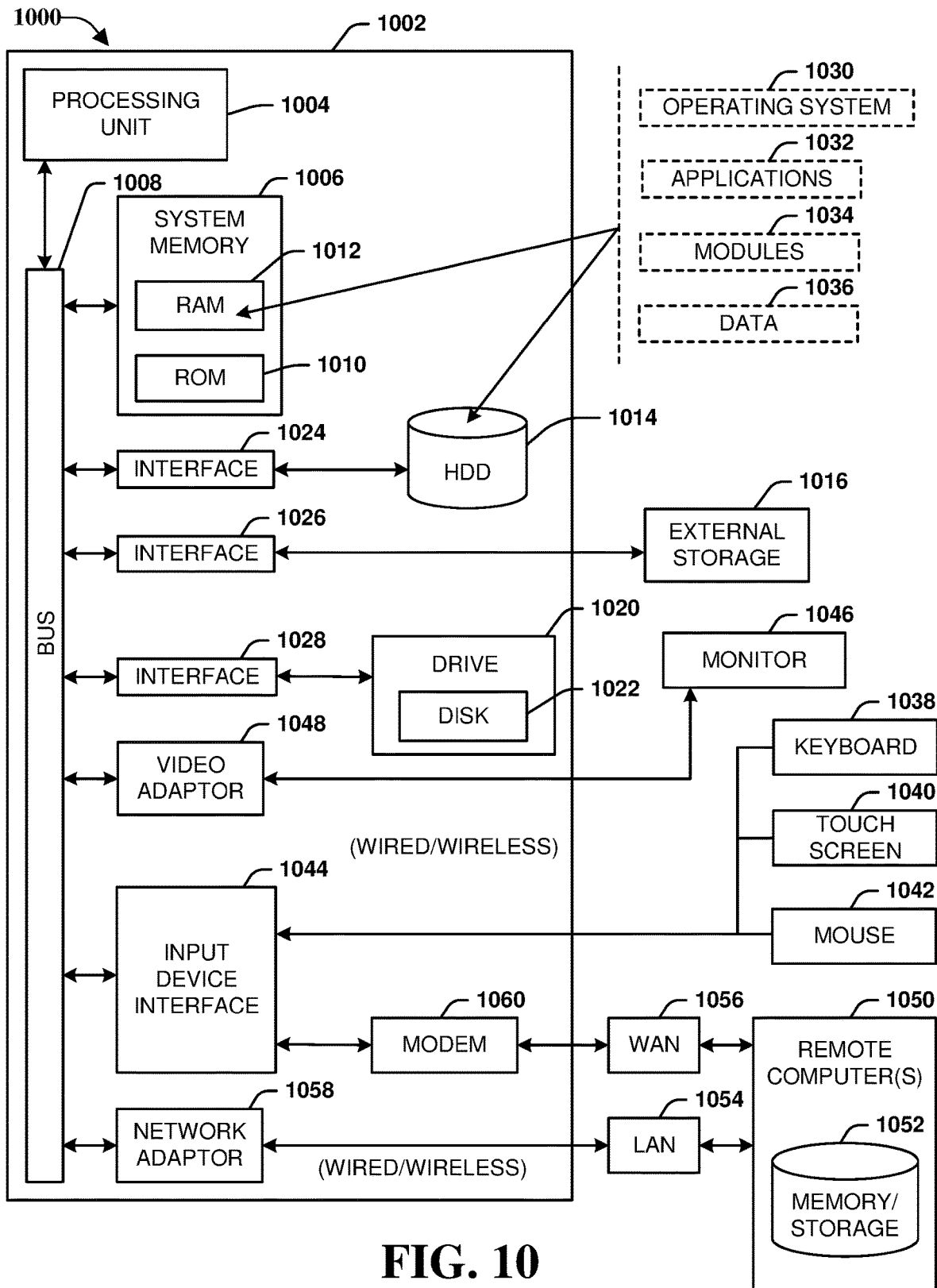
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   monitoring, by security equipment comprising a processor, resource sharing communication between first network equipment and second network equipment via a network;
   based on the resource sharing communication, detecting, by the security equipment, a condition of the resource sharing communication that has a likelihood of indicating a defined adverse event that has at least a threshold likelihood,
   wherein the detecting comprises detecting a communicated quantity of a command and comparing the communicated quantity of the command to quantities described at a plurality of specified resource sharing profiles that is accessible to the security equipment,
   wherein the plurality of specified resource sharing profiles defines a plurality of defined adverse events, comprising the defined adverse event, and
   wherein at least one of the specified resource sharing profiles, of the plurality of specified resource sharing profiles, defines the defined adverse event as comprising execution of a specified quantity of the command, as being comprised by the quantities; and
   in response to the comparing and the detecting the condition, facilitating, by the security equipment, suspending the resource sharing communication between the first network equipment and the second network equipment.

2. The method of claim 1, wherein the resource sharing communication comprises a combination of commands, comprising the command, issued by the first network equipment that restricts access to resources stored by the second network equipment.

3. The method of claim 2, wherein the defined adverse event comprises an unauthorized restriction of access to the resources.

4. The method of claim 3, wherein the unauthorized restriction of access to the resources stored by the second network equipment comprises a ransomware attack targeting the resources stored via the second network equipment.

5. The method of claim 2, wherein the combination of commands comprises a combination of:
   a create command that incorporates an amount of resources above a specified threshold number of resources into a created resource, wherein the specified threshold is employed by the security equipment to execute the detecting, and a removal command that removes the resources incorporated into the created resource.

6. The method of claim 1, further comprising:
   in response to the suspending, analyzing, by the security equipment, activity of the first network equipment that, aggregated with a result of the detecting, causes the security equipment to modify a specified resource sharing profile, of the plurality of specified resource sharing profiles, to reduce the likelihood of a false positive identification of the defined adverse event.

7. The method of claim 6, further comprising:
   as part of analyzing, by the security equipment, the activity of the first network equipment, receiving input from an entity device associated with an administrative entity associated with the first network equipment that indicates that the resource sharing communication, which satisfied the specified resource sharing profile, was non-malicious resource sharing communication.

8. The method of claim 6, wherein the modifying of the specified resource sharing profile comprises changing a quantity of the specified data-based resources.

9. The method of claim 1, wherein the plurality of specified resource sharing profiles defines the adverse event being from a group of adverse events comprising denial of service, ransomware, file tampering, and data leaking.

10. The method of claim 1, wherein the plurality of specified resource sharing profiles defines the adverse event as comprising a threshold quantity of one or more specified commands.

11. Server equipment, comprising:
a processor; and
a memory that stores executable instructions that, when executed by the processor, facilitate performance of operations, comprising:
establishing server communications with client equipment via a network, and receiving an indication that the server communications with the client equipment have been suspended by network equipment that is part of the network,
wherein the network equipment suspended the server communications based on a determination, via the network equipment, of a likelihood of at least a threshold likelihood, that the server communications were communicated by the client equipment to maliciously restrict access to computer files,
wherein the determination comprised comparing a quantitative baseline, defining a quantity of manipulations of the computer files by a set of one or more commands, to a requested quantity of manipulations of the computer files as specified by a set of one or more commands issued by the client equipment, via the network, to be implemented at the server equipment,
wherein the quantitative baseline is defined in one or more resource sharing profiles that are accessible by the network equipment, and
wherein the quantity of manipulations is associated with a historically performed and malicious restriction of access to at least one computer file of the computer files.

12. The server equipment of claim 11, wherein the likelihood of at least the threshold likelihood, that the server communications were communicated by the client equipment to maliciously restrict the access to the computer files comprises the likelihood of at least a cryptographic malware attack by the client equipment on the computer files stored via the server equipment.

13. The server equipment of claim 12, wherein the server communications comprise a combination of commands that comprises:
a create command that encrypts an amount of the computer files above a threshold number of the computer files into an encrypted computer file, and
a removal command that removes the computer files encrypted into the encrypted computer file from the server equipment.

14. The server equipment of claim 11, wherein the operations further comprise:
after suspension of the resource communication, determining that the resource communication, while failing to satisfy the quantitative baseline, is intentionally atypical, according to a defined criterion, and not associated with the defined adverse situation.

15. A non-transitory machine-readable medium, comprising executable instructions that, when executed by a processor of a first network device, facilitate performance of operations, comprising:
monitoring resource communication between a second network device and a third network device via a network;
based on the monitoring of the resource communication, identifying a condition of the resource communication that indicates, to at least a threshold likelihood, a defined adverse situation;
in response to identifying the condition, suspending the resource communication between the second network device and the third network device; and
in response to the suspending, analyzing activity of the third network equipment, comprising aggregating first data, from the analyzing, with second data employed for identifying the condition; and
based on a result of the analyzing, modifying a specified resource sharing file that is accessible by the first network device to reduce a level of likelihood of a false positive identification of the defined adverse situation according to the specified resource sharing file,
wherein the specified resource sharing file defines the defined adverse situation as comprising execution of the resource communication comprising the condition, and wherein the condition comprises manipulation of a specified quantity of resources defined in the specified resource sharing file.

16. The non-transitory machine-readable medium of claim 15, wherein the resource communication comprises a combination of messages issued by the second network device that implicate a restriction of access to resources stored via the third network device.

17. The non-transitory machine-readable medium of claim 16, wherein the combination of messages comprises a combination of:
a first message comprising a create command that aggregates an amount of resources above a specified threshold number of resources into a created resource,
wherein the specified threshold is defined by the specified resource sharing profile employed by the processor of the first network device, and wherein the specified resource sharing profile defines the defined adverse situation as comprising a threshold quantity of one or more commands, comprising the specified threshold, and
a second message comprising a removal command that removes the resources from the third network device that were incorporated into the created resource.

18. The non-transitory machine-readable medium of claim 15, wherein the defined adverse situation comprises an unauthorized software component using server message block protocol commands to restrict access to the third network device using encryption.

19. The non-transitory machine-readable medium of claim 15, wherein the operations further comprise:
obtaining input from an entity device associated with an administrative entity associated with the third network equipment, wherein the input indicates that the server communications were non- malicious server communications; and
aggregating the input with the second data employed for the identifying the condition and with the first data from the analyzing the activity of the third network equipment to generate the determination.

20. The non-transitory machine-readable medium of claim 15, wherein the operations further comprise:
   comparing the resource communication to a quantitative baseline that defines a baseline quantity of a command historically performed to a quantity of a set of commands issued using the resource communication the first network equipment, via the resource sharing communication,
   wherein the identifying the condition is at least partially based on the comparing.

* * * * *